Jan. 4, 1955　　　　　J. BEIER　　　　　2,698,526
SHAFTING FOR POWER TRANSMISSION
IN MOTOR-DRIVEN VEHICLES
Filed April 14, 1949　　　　　　　　　　　4 Sheets-Sheet 3

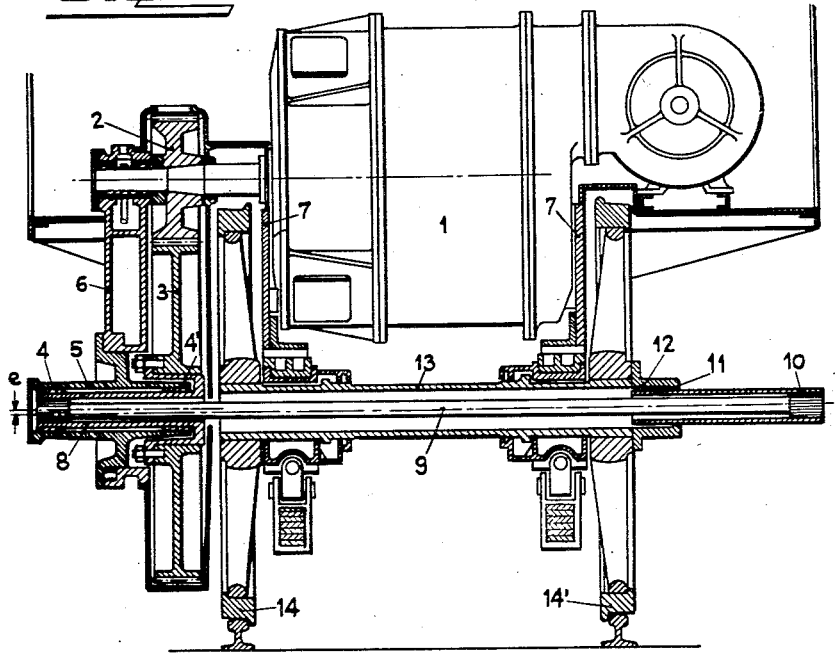
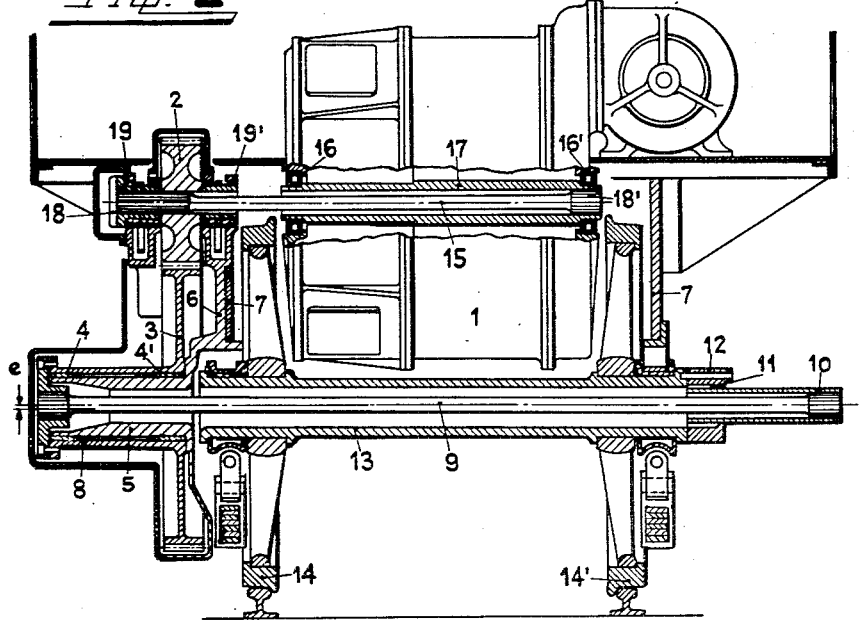

INVENTOR:
JOSEF BEIER
BY [signature]

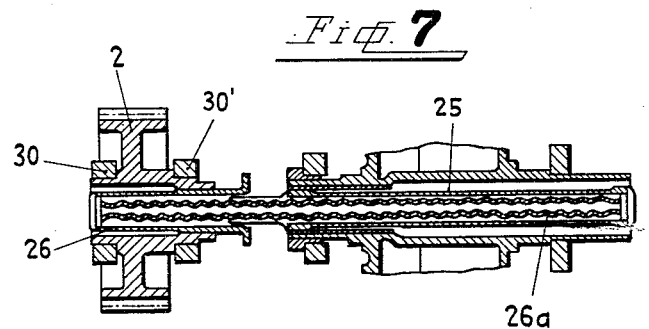
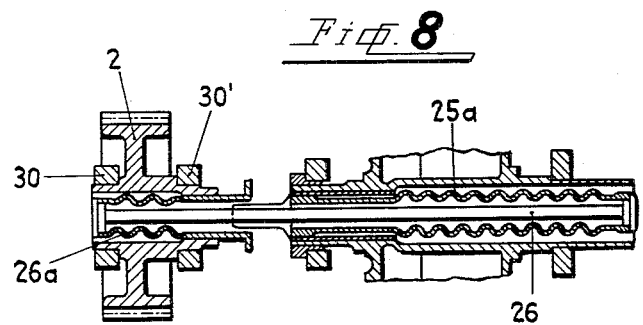
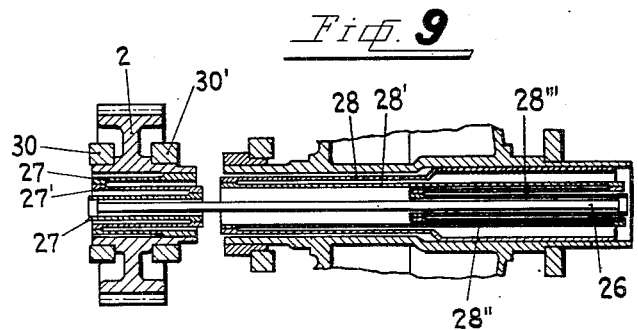

United States Patent Office 2,698,526
Patented Jan. 4, 1955

2,698,526

SHAFTING FOR POWER TRANSMISSION IN MOTOR-DRIVEN VEHICLES

Josef Beier, Altmunster-Ebenzweier, Austria

Application April 14, 1949, Serial No. 87,468

Claims priority, application Switzerland April 14, 1948

3 Claims. (Cl. 64—1)

This invention relates generally to power transmission means.

The present invention relates to a device for coupling drive means to a driven means, and more particularly to a power transmission constructed to absorb torsional forces emanating from said drive means and bending forces emanating from said driven means.

With the known power transmissions used in motor-driven vehicles, and in particular on railway rolling stock, the displacement occurring between the wheels and the driving motor caused by the suspension of the axle is taken care of by the relative movement of various parts. With the individual drives of electric railway rolling stock a construction is known in which the movement of the axle resulting from the action of the spring in relation to the parts fixed to the frame of the vehicle is taken up solely by the deformation of springs. With this design several coil springs are mounted tangentially within the circumference of the driving wheels, respective ends of said coil springs being connected to the driving wheel whereas respective opposite ends are rigidly connected to arms arranged on a quill shaft rotatably mounted in the frame of the vehicle. The disadvantages of this construction are, namely, the necessity of having a relatively large driving wheel diameter, of having a quill shaft, and of having to locate the gear transmission from the motor to the axle between the driving wheels thus limiting the constructional length of the motor. In addition, the coil springs arranged tangentially within the circumference of the driving wheel are subjected to centrifugal stress caused by their weight at high speeds. Furthermore, a construction is known in which elastic discs are arranged at the left and right sides of the motor. To achieve the considerable elasticity required of the discs consisting of steel, the discs must have a large diameter. In addition the discs take up a certain amount of space on either side of the motor which space could be utilized for the axial constructional length of the motor at greater outputs. In the tangential direction these elastic discs have no resilience which also can be considered as a further disadvantage.

The present invention relates to an improvement of a power transmission in motor-driven vehicles, in particular in railway rolling stock, and according to it, at least one torsion bar spring is arranged in the train of power transmission from the motor to the driving wheels to take care of the required movement caused by the suspension between the motor and the driven wheels.

The above and still further objects of the present invention will become apparent upon consulting the following detailed description of the invention taken in conjunction with the drawings, wherein:

Fig. 1 is an elevational view, partly in section, of a first embodiment of the present invention;

Fig. 2 is an elevational view, partly in section, of a second embodiment;

Fig. 7 is a fragmentary sectional view of a sixth embodiment;

Fig. 8 is a fragmentary sectional view of a seventh embodiment; and,

Fig. 9 is a fragmentary sectional view of an eighth embodiment.

Figure 3:
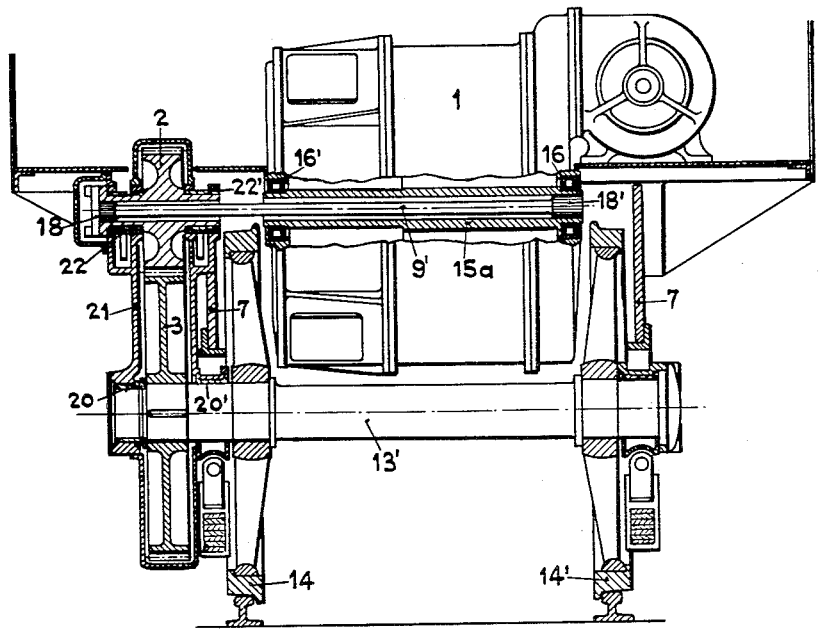
Fig. 3 is an elevational view, partly in section, of a third embodiment.

Referring now in particular to Fig. 1, numeral 1 designates a driving motor for driving wheels of a railway vehicle and numeral 2 is a pinion on the shaft of motor 1 which is in driving connection with a large gear wheel 3. The gear wheel 3 is rigidly mounted on a sleeve 8, the sleeve 8 being supported by bearings 4,4' of a bearing boss 5 connected to a bearing block 6, which in turn is secured to the frame 7 of the vehicle. The sleeve 8 is rigidly connected to one end of a torsion bar 9. The torsion bar 9 extends with considerable clearance through the hollow axle 13 of the driving wheels 14, 14' and is rigidly connected at its other end through the intermediary of a sleeve 10, a spline 11 and a coupling piece 12 to the axle 13 of the driving wheels.

The motor 1 drives the axle 13 of the driving wheels 14, 14' through the pinion and gear wheel 2, 3, the sleeve 8, the torsion bar 9, the sleeve 10, the spline 11 and the coupling piece 12. Accordingly, the torsion bar 9 is a link in the train of power transmission from the motor 1 to the driving wheels 14, 14'. When the axle 13 of the driving wheels is displaced in relation to the frame 7 of the vehicle, the bar 9 is bent along its longitudinal axis according to the axis of elasticity. The bending stresses which occur are small because of the length of the bar 9 so that it is also possible to fit the axis of the large gear wheel off-set permanently from the axis of the axle 13 of the driving wheels by the amount of eccentricity *e* in order to reduce the distance between the axes of the large gear wheel 3 and the motor shaft. Because of the great torsional elasticity of the bar 9, all the torque shocks occurring during motion are kept away from the driving motor 1 by the utilization of said torsion elasticity. Furthermore, upon starting of the vehicle, the motor can rotate about a relatively large angle (up to half a revolution) before the vehicle starts to move. This is of particular advantage in connection with single phase motors generally used in which high voltages occur at the brushes on starting since the collector segments under the brushes can move due to the rotation of the motor shaft although the vehicle is still at rest thus preventing burnt spots at the collector. With the single phase motors the motor torque, pulsating with the double frequency of the current supply, is taken up by the large amount of tangential elasticity and transmitted uniformly to the driving axle thus utilizing fully the starting tractive effort of the vehicle up to the limit of the adhesive friction.

According to the second embodiment shown in Fig. 2, the shaft 17 of the motor 1 takes the form of a hollow shaft supported in the bearings 16, 16'. Through this shaft 17 a torsion bar 15 with ample clearance extends and is connected at its right hand end 18' with the shaft 17. The bar 15 is rigidly connected at its other end with the driving pinion 2 by means of a flange 18, and the driving pinion 2 is supported in the bearings 19, 19' independently of the motor. In the first embodiment, a vehicle with inside frames has been illustrated, whereas in the second embodiment, a vehicle with outside frames 7 has been shown. Accordingly, the supporting of the large gear wheel 3 is carried out somewhat differently than that shown in Fig. 1; in the embodiment of Fig. 2 a greater length of the motor 1 is possible.

Due to the small diameter of the torsion bar 9, a further advantage is realized in that the distance between the axes of the motor 1 and the large gear wheel 3 can be further reduced since the clearance between the former and the flange of the wheels can be reduced by the difference between the diameter of a normal motor shaft and that of the thin torsion bar 15. In addition, the removal of the motor can be carried out downwardly after the bar 15 has been extracted to the left after removal of the screws (not shown) in the coupling flange 18. Further the driving wheels 14, 14' can similarly be lowered out of the frame for the purpose of overhauling since the torsion bar 9 together with the supporting sleeve 8 can be withdrawn to the left after removal of the coupling piece 12 and of the supporting sleeve 5.

According to the embodiment shown in Fig. 3, the large gear wheel 3 is rigidly mounted on the solid driving axle 13'. Similarly, the bearing block 21 which is supported on the axle in the bearings 20 and 20' and which supports the driving pinion 2 and the bearings 22 and 22', follows together with the driving axle 13' the motion of the springs which connect the driving axle 13' with the frame 7 of the vehicle. To take care of this motion of the springs in relation to the motor 1, a torsion bar 9' is again provided, the torsion bar extending with clearance through the hollow shaft 15a of the motor, the torsion bar 9' being connected with the driving pinion 2 through the coupling flange 18 and through the spline 18' with the motor shaft 15a. The vertical guidance of the bearing block 21 takes place in conventional manner in horn blocks of the frame 7 or by means of horizontally disposed radial arms, one end of said arms being connected to the bearing block and the other to the frame of the vehicle.

With the electric locomotives built nowadays all the parts of the drive must be disposed within the space between the wheel tires because of the bogie construction used. Since, however, the capacity of deflection of bar and tube-shaped bodies decreases by the third power of their length, the single torsion bar shown in the first three figures is no longer sufficient for increased displacement caused by the suspension. Accordingly, Fig. 4 shows a further embodiment of the invention.

Figure 4:
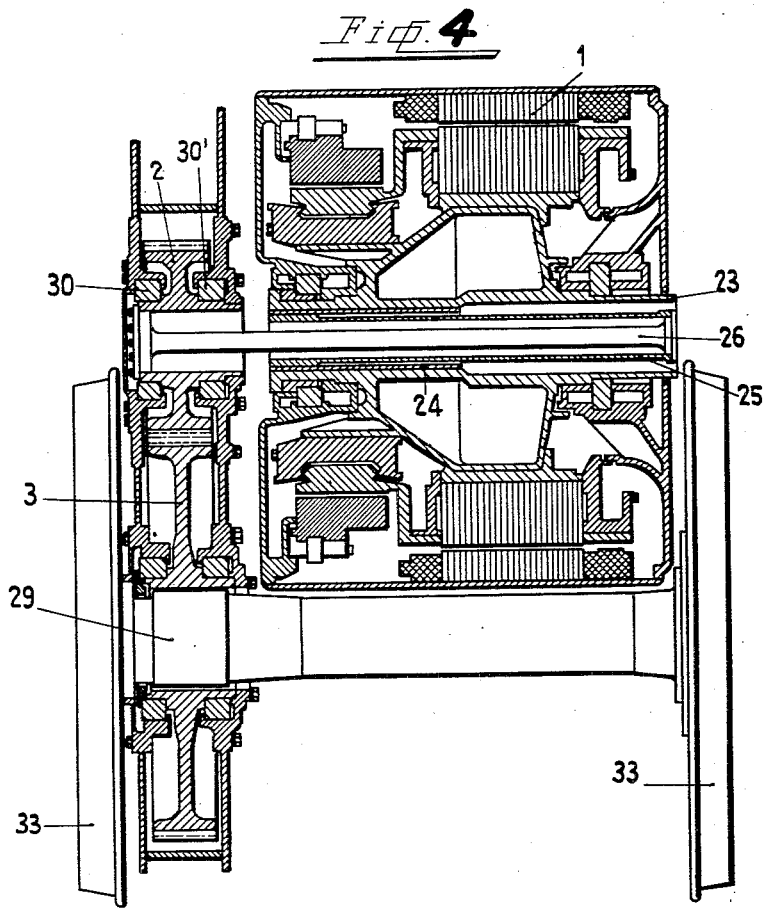
Fig. 4 is an elevational view, partly in section, of a fourth embodiment.

In Fig. 4 the drive motor or drive means designated by the numeral 1 is rigidly mounted on the frame and fitted with a hollow drive shaft 23. Arranged within the drive shaft 23 at one end thereof is a connecting shaft 24. Positioned within the drive shaft 23 is an elastic tubular member 25 having opposite ends each with inner and outer surfaces.

Tubular member 25 has its outer surface at one of its opposite ends secured to the hollow drive shaft 23 through the connecting sleeve 24. Extending into the tubular member 25 is torsion member 26, which is supported solely at its extremities. One of the extremities of the torsion member 26 is fixedly secured to the inner surface of the tubular member 25 at the end of the latter remote from the end secured to the hollow drive shaft. The other extremity of the torsion member 26 extends beyond the tubular member 25 and is operatively connected to the pinion 2, the latter being supported in the bearings 30, 30' and engaging with a gear wheel 3 fixedly secured to the solid axle 29. Secured to the ends of the axle 29 are the drive wheels of the vehicle which are designated by the numeral 33.

Figure 5:
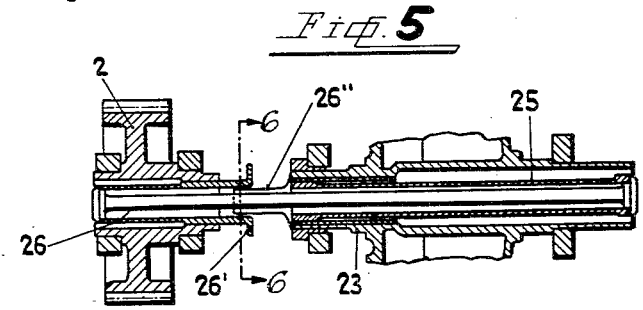
Fig. 5 is a fragmentary sectional view of a fifth embodiment of the present invention.
Figure 6:
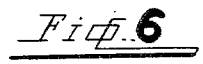
Fig. 6 is a sectional view taken along the line 6—6 of Fig. 5.

To further increase the capacity for deflection and the bending forces emanating from the drive motor 1, an additional elastic tubular member 26 can be fitted within the pinion 2, as clearly illustrated in Fig. 5. Referring with particularity to Fig. 5 there is shown a tubular member having opposite ends each with inner and outer surfaces, the inner surface at one end being fixedly secured to the adjacent end of the torsion member 26 and the outer surface contiguous to the outer end thereof being fixed to the pinion 2.

To prevent racing of the drive motor should a break occur in the transmission means, dogs or abutments 26', 26" are operatively connecting to the drive motor 1 and the driven pinion 2. The respective abutments are engageable with each other upon breaking of the torsion member 26, to form an auxiliary coupling between the drive motor 1 and the driven pinion 2.

Normally, the dogs or abutments 26', 26", do not come into contact even under the greatest deflection encountered, but form an auxilliary coupling upon a breaking occurrring in the power transmission, thereby allowing the vehicle to proceed under its own power until it is taken out of service.

The elasticity of the torsion member 26, as well as the various tubular members, such as 23, must be selected of a value at least sufficient to absorb the torsional forces emanating from the drive motor and the bending forces emanating from the driven wheels and pinions.

Fig. 7 shows an embodiment in which the torsion bar 26 is replaced by a corrugated tube 26a which is made either of one piece or of several ring-shaped parts fitted together.

Fig. 8 illustrates a particularly flexible arrangement. In this embodiment resilient tubes 25 and 26 are replaced by the corrugated tubes 25a, 26a which are made either of a single piece or of several ring-shaped parts fitted together.

According to the embodiment of Fig. 9 the same flexibility is achieved by having several resilient tubes 28, 28', 28", 28''' and 27, 27' and 27", respectively, fitted into each other and rigidly connected to each other.

By this means each of these resilient tubes takes care of part of the necessary flexing, so that for each part the individual flexing is decreased and with the same overall stress an increased elastic motion between motor and axle is made possible.

In comparison with the known elastic disc drive mentioned hereinbefore, the following advantages result from the power transmission according to the present invention:
 1. Saving of space in axial direction,
 2. Saving of weight by elimination of heavy elastic disc means,
 3. Reduced price, and
 4. Exceptionally great elasticity in the tangential direction.

With all of the embodiments herein described, it is possible to give the driving wheels and axles a certain amount of lateral play by providing sufficient axial clearance in the bearings.

A further advantage of the power transmission described is the possibility of keeping the unsprung weight to a minimum, i. e. to make the driving wheels and driving axles of light weight, the hollow bore of the latter contributing greatly to this end. The driving wheels are of particularly light weight because they require neither fittings for the engagement of transmission elements nor any counter weights for balancing such fittings.

Furthermore a power transmission according to the invention is inexpensive to manufacture since no special accuracy in the relative mounting of motor, power transmission and driving axle is necessary because of the elasticity present in such structure. Finally the possibility of off-setting between the center of the driving gear wheel and the center of the driving wheels by the eccentricity $e$ allows a greater ratio between motor and driving axle to be chosen thus permitting a higher speed of the former and permitting installation of a motor of increased output.

Although many embodiments of the invention have been described and shown in the drawings, it should be noted that the invention may be realized in modified form and adaptations of the arrangements herein disclosed may be made as may readily occur to persons skilled in the art without constituting a departure from the spirit and scope of the invention as defined in the objects and in the appended claims.

Having thus described the invention, what is claimed as new and desired to be secured by Letters Patent is:

1. Power transmission means interconnected between drive means and driven means for coupling said drive means to said driven means, comprising a hollow drive shaft operatively connected to said driven means, a tubular member arranged within said hollow drive shaft and having one end thereof secured to one end of said hollow drive shaft, a torsion member supported solely at its extremities and having one of said extremities extending through said tubular member and connected to the other end of said tubular member, the other of said extremities of said torsion member projecting beyond and terminating at a location spaced from said one end of said tubular member, and means operatively connecting said other of said extremities of said torsion member with said driven means, said torsion member and said tubular member being made of elastic material having a value at least sufficient to absorb torsional forces emanating from said drive means and bending forces emanating from said driven means.

2. Power transmission means according to claim 1, including a further tubular member arranged about said torsion member and having one end connected to said torsion member and the other end connected to said driven means.

3. Power transmission means according to claim 1, including respective abutment means operatively connected to said drive means and to said driven means and engaging with each other upon breaking of said torsion member to form an auxilliary coupling between said drive means and said driven means.

UNITED STATES PATENTS

| | | |
|---|---|---|
| 839,803 | Amsler | Jan. 1, 1907 |
| 993,570 | Webster | May 30, 1911 |
| 1,275,029 | Holy | Aug. 6, 1918 |

FOREIGN PATENTS

| | | |
|---|---|---|
| 2,186 | Great Britain | Dec. 8, 1873 |
| 302,625 | Great Britain | 1928 |